US008489533B2

(12) United States Patent
Wang et al.

(10) Patent No.: US 8,489,533 B2
(45) Date of Patent: Jul. 16, 2013

(54) INFERRING VIEW SEQUENCE AND RELEVANCE DATA

(75) Inventors: Kuansan Wang, Bellevue, WA (US); Xiaolong Li, Sammamish, WA (US); Nikolas Clemens Gloy, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 12/499,092

(22) Filed: Jul. 8, 2009

(65) Prior Publication Data

US 2011/0010323 A1  Jan. 13, 2011

(51) Int. Cl.
*G06F 17/00* (2006.01)
(52) U.S. Cl.
USPC ............................................................. 706/46
(58) Field of Classification Search
None
See application file for complete search history.

(56) References Cited

U.S. PATENT DOCUMENTS

| | | | |
|---|---|---|---|
| 2006/0064411 A1* | 3/2006 | Gross et al. | 707/3 |
| 2007/0112742 A1 | 5/2007 | Dumais et al. | |
| 2008/0005104 A1 | 1/2008 | Flake et al. | |
| 2009/0099891 A1 | 4/2009 | Cohen et al. | |

OTHER PUBLICATIONS

Joachims, "Optimizing Search Engines Using Clickthrough Data", 2002, Proceeding of eight ACM SIGKDD international, pp. 1-10.*
Xu et al., "A User-Oriented Webpage Ranking Algorithm Based on User Attention Time", Proceedings of the Twenty-Third AAAI Conference on Artificial Intelligence, Jul. 13-17, 2008, pp. 1255-1260.*
Sarukkai, "Link Prediction and Path Analysis Using Markov Chains", Jun. 2000, Computer Networks, vol. 33 No. 1, pp. 377-386.*
Zagorodnov, et al., "WAIFR: Web-Browsing Attention Recorder Based on a State-Transition Model", Retrieved at <<http://www.cs.ucsb.edu/~dmitrii/research/pubs/zagorodnov_waifr_cama06.pdf>>, Proceedings of the 1st International Workshop on Contextualized Attention Metadata: Collecting, Managing and Exploiting of Rich Usage Information, Nov. 10-11, 2006, pp. 1-6.
Fu, et al. "SNIF-ACT: A Cognitive Model of User Navigation on the World Wide Web", Retrieved at <<http://www.humanfactors.uiuc.edu/Reports&PapersPDFs/JournalPubs/FuPirolli07.pdf>>, Human-Computer Interaction, vol. 22, No. 4, Nov. 2007, pp. 355-412.
Aoidh, et al., "Analysing Mouse Movements to Infer Spatial Interests", Retrieved at <<http://ncg.nuim.ie/gisruk/materials/proceedings/PDF/5B3.pdf>>, Proceedings of the 15th Annual ACM International Symposium on Advances in Geographic Information Systems, Nov. 7-9, 2007, pp. 1-5.
Xu, et al., "A User-Oriented Webpage Ranking Algorithm Based on User Attention Time", Retrieved at <<http://www.aaai.org/Papers/AAAI/2008/AAAI08-199.pdf, Proceedings of the Twenty-Third AAAI Conference on Artificial Intelligence, Jul. 13-17, 2008, pp. 1255-1260.

(Continued)

*Primary Examiner* — Jeffrey A Gaffin
*Assistant Examiner* — Paulinho E Smith (57) ABSTRACT

Technologies pertaining to inferring a view sequence of a user are described herein. A view sequence is an order that graphical objects on a graphical user interface are viewed by a user. A view sequence with respect to graphical objects presented on a graphical user interface is inferred based upon historically observed user actions, such as selection of a link or hovering over respective graphical objects. The view sequence is inferred without employment of sensor equipment that tracks eye movements of users.

20 Claims, 7 Drawing Sheets

OTHER PUBLICATIONS

Buscher, Georg, "Attention-Based Information Retrieval", Retrieved at <<http://www.dfki.uni-kl.de/~buscher/publications/Buscher07_AttIR_long.pdf, Proceedings of the 30th Annual International ACM SIGIR Conference on Research and Development in Information Retrieval, Jul. 23-27, 2007, pp. 6.

"Eye-Tracking Studies: More than Meets the Eye", Retrieved at <<http://googleblog.blogspot.com/2009/02/eye-tracking-studies-more-than-meets.html>>, May 18, 2009, pp. 1-5.

* cited by examiner

INFERRING VIEW SEQUENCE AND RELEVANCE DATA

BACKGROUND

Oftentimes in graphical user interfaces displayed via a computer, it is desirable to display a plurality of graphical items to a user. Furthermore, it may be desirable to a designer of the graphical user interface to have the user view graphical items on the graphical user interface in a certain sequence (e.g., most important information should be consumed first by the user). For instance, the designer of the graphical user interface may wish that the user first view a first graphical item and thereafter view a second graphical item, and if the user is not interested in the first two graphical items, thereafter view a third graphical item. Conventionally, ascertaining a view sequence of users to aid in designing a graphical user interface has been relatively expensive, wherein a view sequence is a sequence in which a plurality of graphical items are viewed.

One conventional mechanism for ascertaining view sequences of users is to display a graphical user interface to a plurality of users and thereafter have the users indicate which graphical items they viewed and in which sequence such graphical items were viewed. Data obtained from such a survey approach may be skewed, however, as users may act differently in a laboratory environment and may inaccurately describe which graphical items were viewed and in what order the graphical items were viewed. Furthermore, obtaining space for a laboratory, managing such experiments, etc., can be an expensive endeavor.

Another example approach that has been conventionally employed to ascertain view sequence of users is to utilize eye tracking devices to monitor where users focus their eyes with respect to graphical items displayed on the graphical user interface. This approach is also expensive, as users must be obtained to perform the experiments, and the eye tracking systems are known to be relatively expensive. Furthermore, as noted above, users may act differently in a laboratory/experimental setting.

To mitigate expense associated with ascertaining how users view graphical items in a graphical user interface, designers of graphical user interfaces typically assume that viewers of the graphical user interface view graphical items sequentially from left to right and/or top to bottom. In reality, however, users often will initially view graphical items from top to bottom or left to right, and thereafter return their focus to a previously viewed graphical item.

SUMMARY

The following is a brief summary of subject matter that is described in greater detail herein. This summary is not intended to be limiting as to the scope of the claims.

Various technologies pertaining to inferring the view sequence of users with respect to graphical items in a graphical user interface are described herein, wherein the view sequence indicates an order in which graphical items in a graphical user interface are viewed by one or more users. As will be described in greater detail herein, the view sequence can be inferred based upon observed user actions with respect to at least some of the graphical items displayed in the graphical user interface. For example, the user action may be a selection of a link or image through utilization of a pointing and clicking device (e.g., a mouse), a hover of a mouse over a graphical item, or other suitable observable user action.

In an example, the view sequence of a user can be inferred with respect to search results displayed to a user via a graphical user interface based at least in part upon observed sequential action data pertaining to such search results displayed in the graphical user interface. A search log of the search engine can be analyzed to ascertain user actions with respect to a plurality of selectable search results over time. For example, the search log can include data indicating which search results were clicked on by a user, a time that the search result was clicked on by the user, which search results were hovered over by the user, a time that the search results were hovered over by the user, and an anonymous identifier that anonymously identifies the user. Thus, the search log may indicate that a particular user issued a certain query and, upon viewing search results pertaining to the query, selected a first search result, then selected a third search result, then a seventh search result, then a second search result, then the first search result again.

Based upon such sequential action data, the view sequence of a user or set of users can be inferred. For example, a transition probability matrix can be generated for the user or a set of users, wherein an i, j element of the matrix indicates a probability that a user will select search result i immediately following selection of search result j. These probabilities can be determined from analysis for collected data (e.g., search logs). This matrix of observable probabilities can then be used to infer view sequence data. For instance, a view transition matrix can be inferred, wherein an elements i, j of the view transition matrix is a probability that a user will view search result i and then immediately subsequently view search result j. Additionally, a skip matrix can be inferred, wherein the diagonal of the skip matrix (e.g., element j, j) includes an indication of a probability that the user will view search result j and skip search result j (e.g., refrain from selecting search result j). By relating these unknown matrices with the known transition probability matrix, values for the unknown matrices can be inferred and utilized in connection with inferring a view sequence with respect to graphical items in a graphical user interface. In addition, the view sequence may be indicative of relevance of a graphical item displayed on the graphical user interface.

Other aspects will be appreciated upon reading and understanding the attached figures and description.

DETAILED DESCRIPTION

Various technologies pertaining to inferring view sequence data with respect to graphical items displayed on a graphical user interface based at least in part upon observed action sequence data and/or assigning a relevance metric to a graphical item based at least in part on observed action sequence data will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
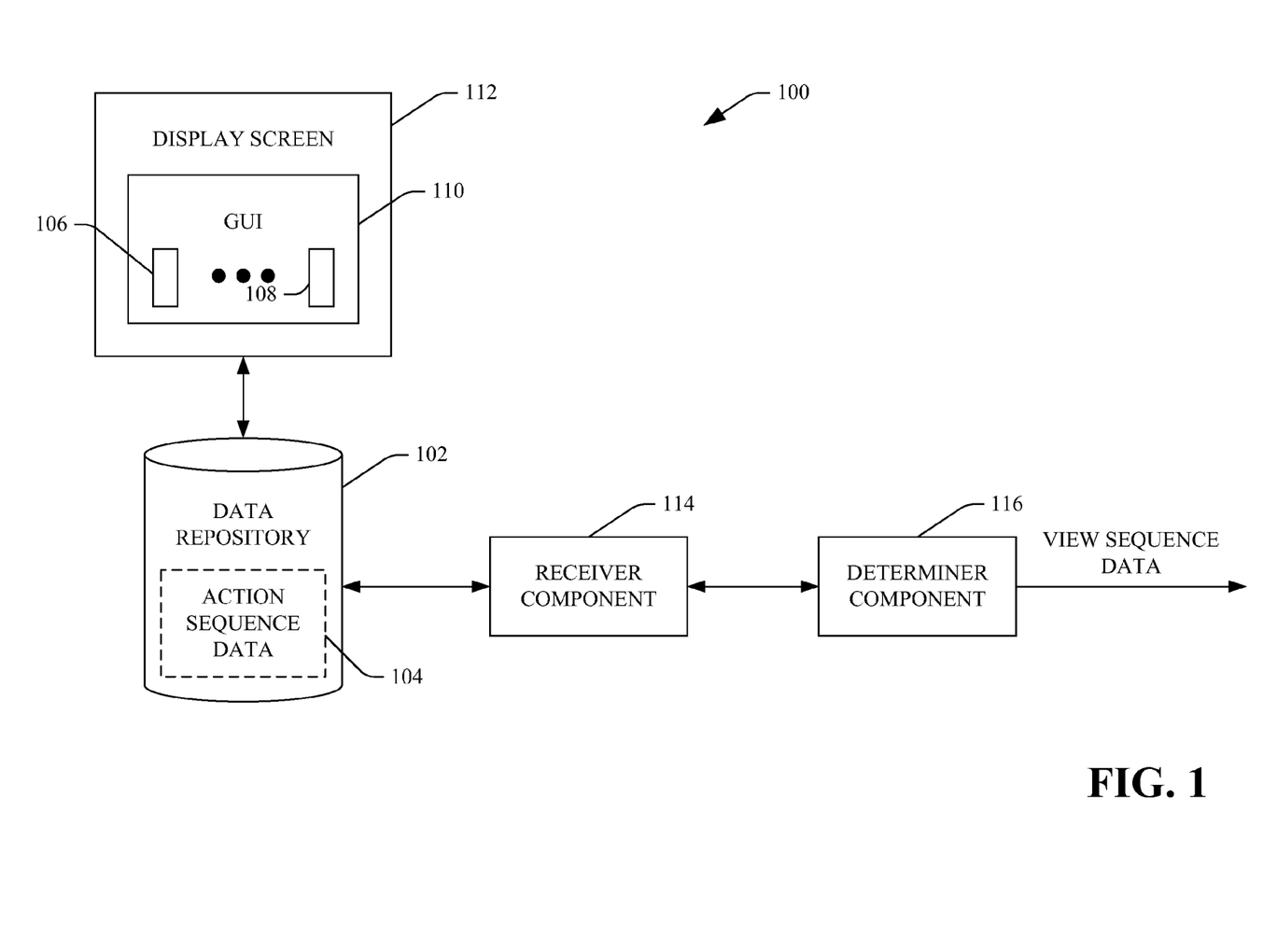
FIG. 1 is a functional block diagram of an example system that facilitates inferring view sequence data based at least in part upon observed action sequence data with respect to graphical items displayed on a graphical user interface.

With reference to FIG. 1, an example system 100 that facilitates inferring view sequence data pertaining to graphical items displayed on a graphical user interface is illustrated. The system 100 includes a data repository 102 that comprises action sequence data 104. As used herein, the action sequence data 104 can be data that is indicative of observable actions of a user, wherein the observable actions comprise a sequence of actions of the user with respect to a first subset of graphical items in a plurality of graphical items 106-108 in a graphical user interface 110 displayed on a display screen 112 of a computing device. For instance, the action sequence data 104 can be indicative of a sequence of selections of graphical items displayed in the graphical user interface 110. Thus, the action sequence data 104 may be or include a search engine log, wherein the search engine log comprises data that is indicative of a query issued by a user, search results displayed to the user responsive to receipt of the query, a search result selected by the user, a time that the search result was selected by the user, an indication that the user has hovered over a certain search result, a time corresponding to when the user hovered over the search result, and data that anonymously but uniquely identifies the user (e.g., so that data of different users is not commingled), amongst other data.

Thus, the graphical user interface 110 may display the plurality of graphical items 106-108 responsive to receipt of a query from the user. The user may then choose to select, or view and skip over, or not view entirely, certain graphical items displayed in the graphical user interface 110. Thus, for instance, the user may select a first search result, review content pertaining to the first search result, return to the search engine and select a third search result, review content pertaining to the third search result, return to the search engine and select a seventh search, etc. These selections and a sequence thereof can be observed and retained in the action sequence data 104. Furthermore, while examples provided herein are described with respect to the user issuing a single query, it is to be understood that action sequence data can be collected with respect to a search session, wherein the search session pertains to multiple queries issued by the user over time (e.g., query reformulations).

Additionally, the user may view one or more graphical items (search results) and choose not to select such graphical items. Thus, continuing with the above example, the user may first select the first search result, return to the search engine and thereafter view the second search result but choose not to select such search result, may then select the third search result, may thereafter return to the search engine and view but choose not to select the fifth search result (not viewing the third result), and then may return to the search engine and select the seventh search result (without viewing the sixth search result). The action sequence data 104 can capture the observable sequential actions of the user. In this example, the action sequence data 104 includes an indication that the user selected the first search result, followed by the third search result, followed by the seventh search result.

The system 100 additionally includes a receiver component 114 that is in communication with the data repository 102. For instance, the receiver component 114 can be configured to access the data repository 102, wherein the data repository 102 may be storage space on a server, a memory buffer, or other suitable hardware that can be utilized in connection with storing the action sequence data 104.

A determiner component 116 is in communication with the receiver component 114, and can infer a view sequence with respect to a second subset of graphical items in the plurality of graphical items 106-108. The view sequence can be an order that the user is inferred to have viewed graphical items displayed in the graphical user interface 110. The second subset of graphical items can include the first subset of graphical items (e.g., the graphical items selected by the user) and at least one other graphical item in the plurality of graphical items 106-108. In other words, the view sequence can be indicative of an order in which certain graphical items in the graphical user interface 110 were viewed by the user, wherein at least one of the graphical items was viewed by the user but not necessarily selected by such user.

Pursuant to an example, and as will be described in greater detail herein, the determiner component 116 can infer the view sequence of the user by relating unknown variables to the observed action sequence data 104. For example, the determiner component 116 can infer view transition probabilities among the graphical items displayed in the graphical user interface 110. That is, the determiner component 116 can infer a probability (view transition probability) that the user will view graphical item i immediately subsequent to viewing a graphical item j. Additionally, the determiner component 116 can infer a probability (skip probability) that the user will view the ith graphical item displayed in the graphical user interface 110, and then skip such graphical item (e.g., not select the graphical item). Based at least in part on such inferred view transition probability and skip probability, the determiner component 116 can infer the view sequence of the user based at least in part upon the observed action sequence data 104. Those skilled in the art can appreciate that skip probability described herein is merely an embodiment of many other possible combinations of features (e.g. relevance, presentation quality) that can be further modeled individually.

Furthermore, the determiner component 116 can infer/determine a measure of relevance pertaining to a graphical item displayed on the graphical user interface 110. In an example, the user may submit a query to a search engine, and responsive to receipt of the query the search engine can cause a plurality of search results to be displayed on the graphical user interface 110. The user may select the first search result, go back to the search results page, view the second search result, view the third result, select the fourth search result, go back to the search results page, select the second search result, and thereafter end the search session. The determiner component 116 can infer the view sequence (e.g., 1, 2, 3, 4, 1). As the user viewed and skipped the third search result, it can be inferred that the third search result may not be as relevant to the query as the fourth search result. Thus, the determiner component 116 can assign/update a measure of relevance with respect to the query to the third search result.

While the examples above have described the graphical user interface 110 as pertaining to a search engine and results displayed to users through utilization of a search engine, it is to be understood that the graphical user interface 110 may display any suitable data so long as user actions can be observed with respect to the graphical items 106-108 on the graphical user interface 110. For instance, the graphical user interface 110 may pertain to a manufacturer that displays selectable links to items that can be purchased by way of the graphical user interface 110. The designer of the graphical user interface 110 may wish to place certain graphical items corresponding to purchasable products in a manner that they are most prominently viewed, or viewed most often by users. By analyzing known observed user action sequence data pertaining to selectable graphical items on the graphical user interface 110, the designer of the graphical user interface 110 can selectively position graphical items on the graphical user interface 110. Thus, design of the graphical user interface 110 may be altered depending upon inferred use sequence as determined by the determiner component 116.

Furthermore, while the action sequence data 104 was described as pertaining to a single user, it is to be understood that the action sequence data 104 may correspond to a plurality of users that are grouped in any suitable manner. For instance, the action sequence data 104 may be or include observed action sequence data for a certain selected grouping of users (e.g., groups based on location, interests, demographic information such as gender or age, etc.). Furthermore, the action sequence data 104 may pertain to a certain query or type of query with respect to a search engine. For example, queries may be navigational in nature, such that an issuer of a navigational query is attempting to navigate to a certain web site. In contrast, an informational query is a query by a user that is searching for particular information. The action sequence data 104 may pertain to a certain type of query, such that view sequences for different queries of certain types can be determined and utilized in connection with more effectively displaying graphical items (search results) to users upon issuance of queries of certain types.

Figure 2:
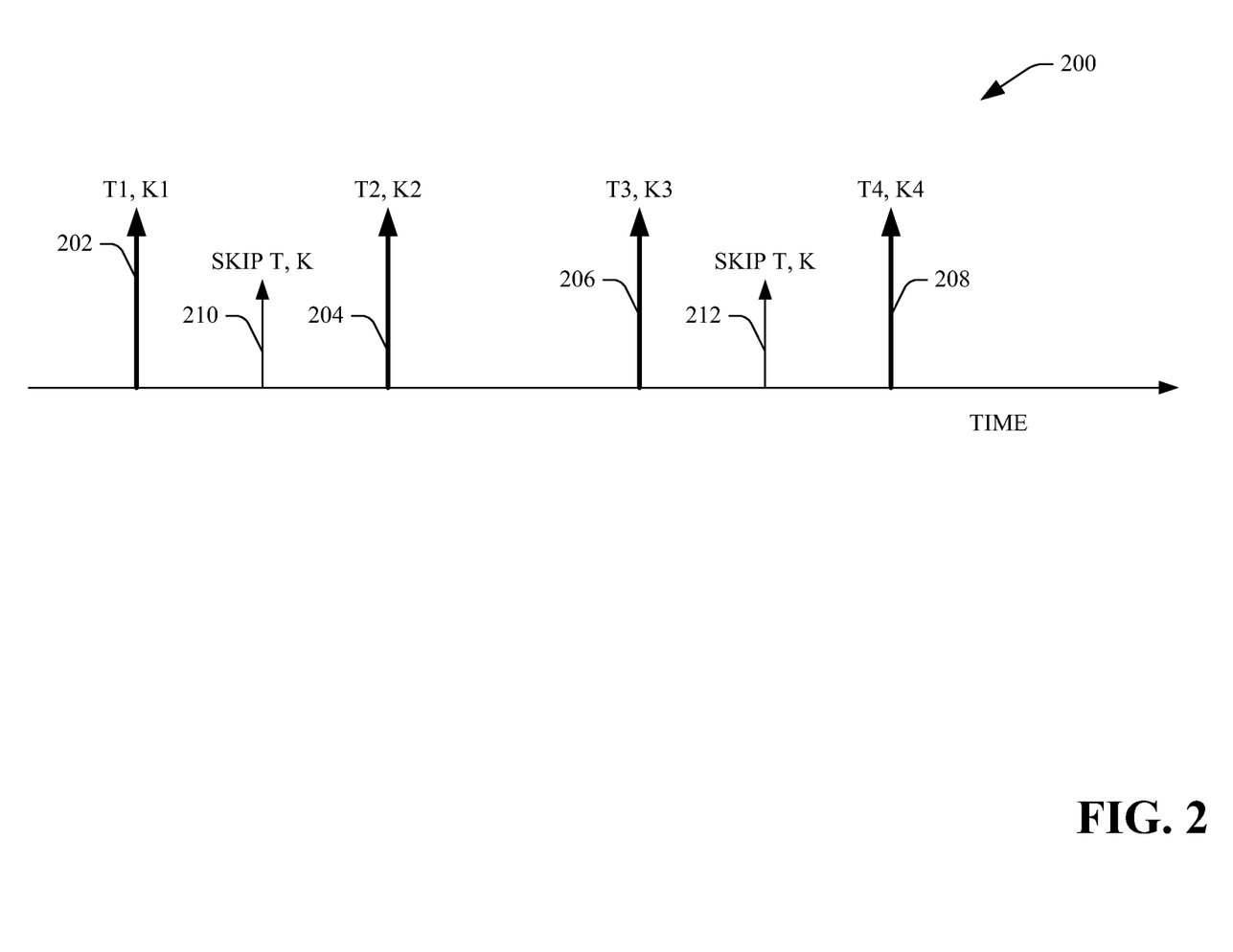
FIG. 2 is a graph illustrating observed selections of graphical items and viewed-but-skipped graphical items.

With reference now to FIG. 2, an example timing diagram 200 that represents action sequence data and view sequence data is illustrated. The diagram 200 includes a first indication 202 that a user has selected a first graphical item K1 at a first time T1, a second indication 204 that the user has selected a second graphical item K2 at a second time T2, a third indication 206 that the user has selected a third graphical item K3 at a third time T3, and an indication 208 that the user has selected a fourth graphical item K4 at a fourth time T4. Thus, the action sequence of the user is the first graphical item K1, followed by the second graphical item K2, followed by the third graphical item K3, followed by the fourth graphical item K4.

A graphical user interface, however, may include additional graphical items. Thus, as can be ascertained, the diagram 200 includes an indication 210 that the user reviewed a particular graphical item K in between selecting the first graphical item and the second graphical item, and chose not to select such graphical item. Additionally, the graph 200 includes another indication 212 that the user viewed another graphical item in between selecting the third graphical item and the fourth graphical item. As indicated above, and as will be described in greater detail below, the determiner component 116 can infer the view sequence, based upon the observed action sequence data (e.g., the indications 202-208 and times corresponding thereto).

Figure 3:
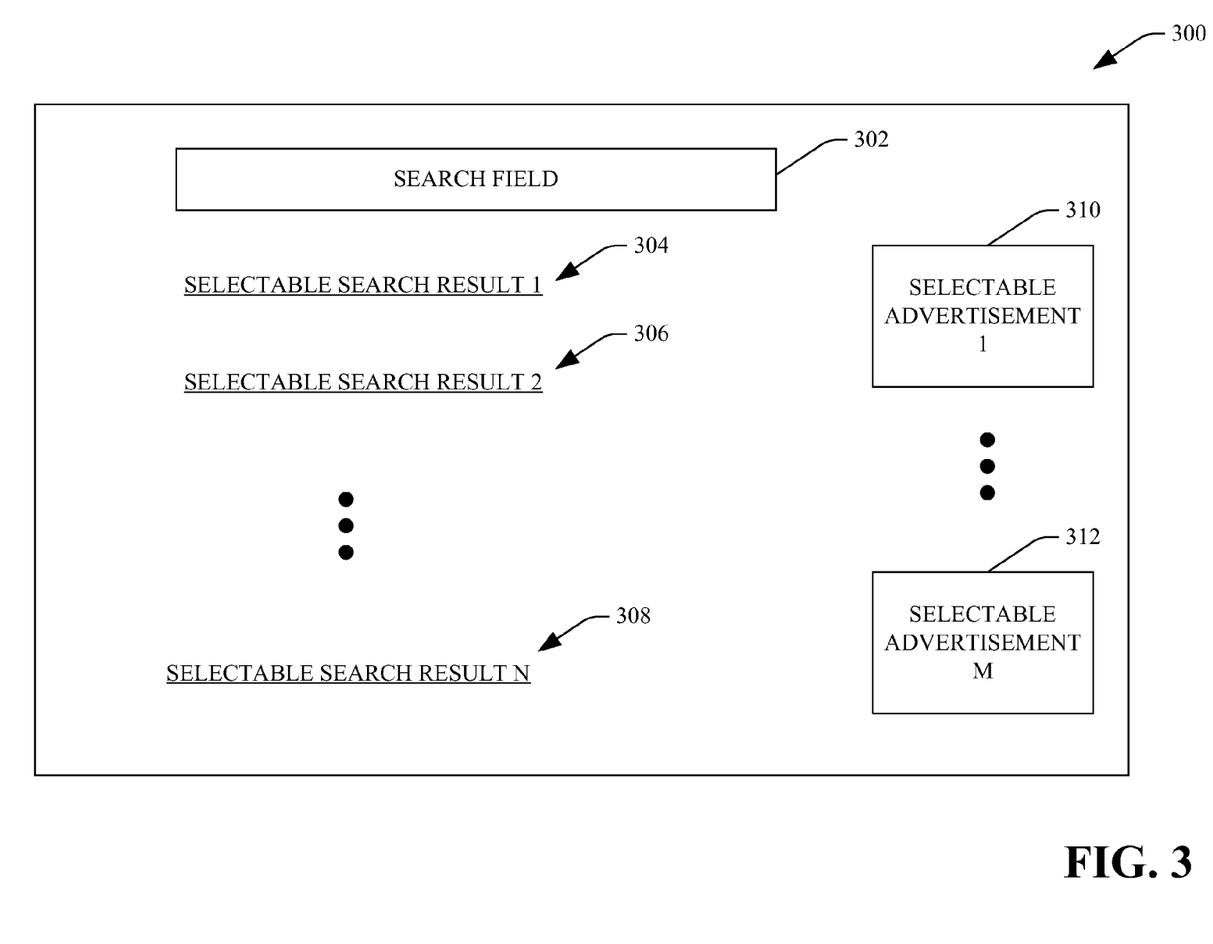
FIG. 3 is an example graphical user interface of a search engine.

With reference now to FIG. 3, an example graphical user interface 300 is illustrated. The graphical user interface 300 pertains to a search engine. The graphical user interface 300 includes a search field 302 where a user can enter a query. A search engine can execute the query and return a plurality of selectable search results 304-308 upon executing the query. Additionally, the graphical user interface 300 may comprise a plurality of selectable advertisements 310-312 that are provided to the user in the graphical user interface 300 upon the search engine executing the query issued by the user.

Pursuant to an example, a user can enter a query into the search field 302 and be provided with the selectable search results 304-308. The user may select the second search result 306, may thereafter select the nth search result 308, and may thereafter select the first search result 304, followed by selection of the advertisement 310. As indicated above, a selection may be a click on a selectable result, a hover over a selectable search result, an audible command that identifies a selectable search result, or other suitable manner for selecting a search result that can be observed. Information pertaining to sequence of selection of search results can be retained in a search engine log. This information includes an indication of which search results were displayed to the user, which advertisements were displayed to the user, which search results were selected or hovered over by the user, and a time that the user performed particular actions with respect to certain search results. The determiner component 116 (FIG. 1) may use the observed action sequence undertaken by the user and may infer a view sequence of the user based at least in part upon the observed data. Furthermore, the determiner component 116 can assign/update a measure of relevance pertaining to at least one of the search results 304-308 and/or advertisements 310-312 with respect to the query.

Figure 4:
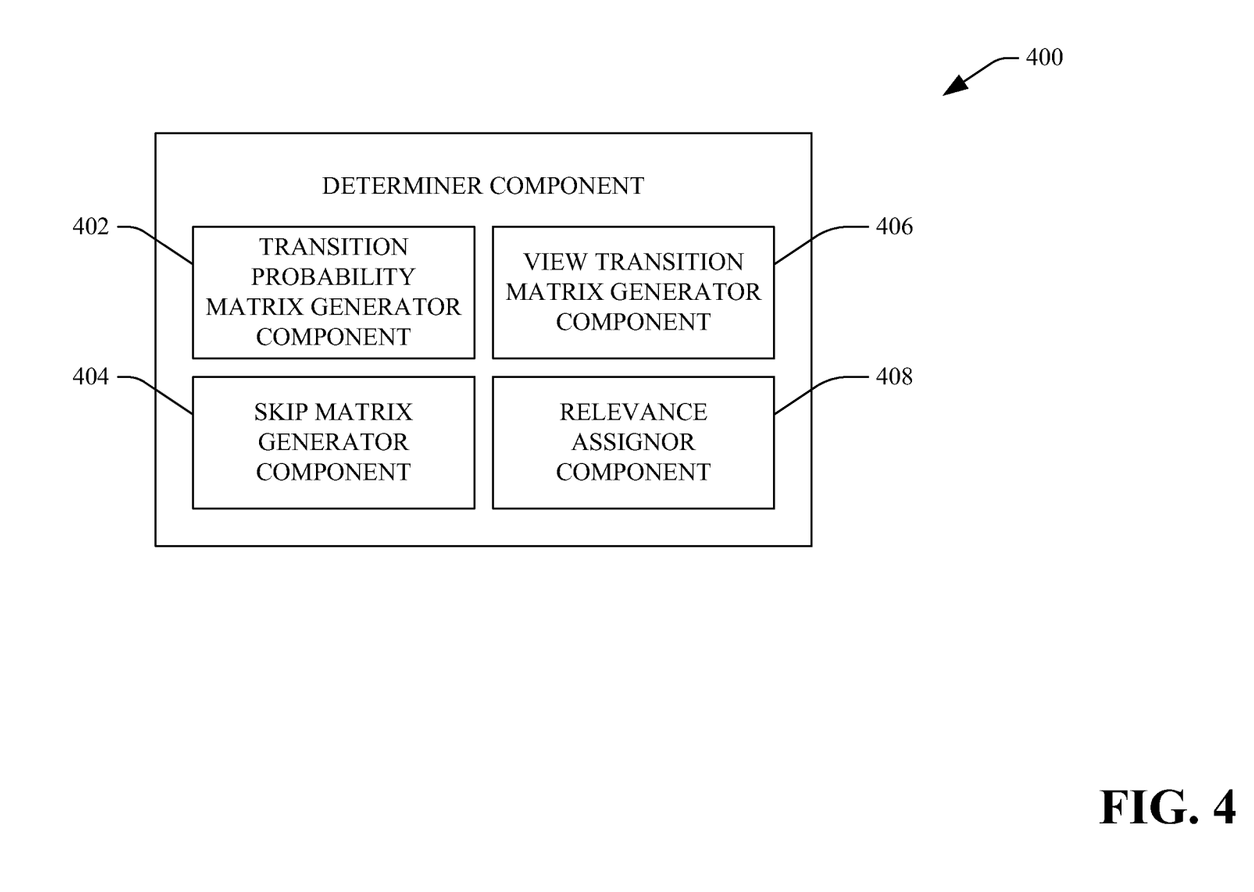
FIG. 4 is a functional block diagram of an example component that facilitates inferring view sequence data pertaining to graphical items displayed on a graphical user interface.

Turning now to FIG. 4, an example depiction of the determiner component 116 is illustrated. As indicated above, the determiner component 116 can receive action sequence data pertaining to selectable graphical items displayed on a graphical user interface, and can infer a sequence in which one or more users view the selectable graphical items displayed on the graphical user interface. Pursuant to an example, the graphical user interface may display n selectable graphical items.

The determiner component 116 includes a transition probability matrix generator component 402. The transition probability matrix generator component 402 can generate a transition probability matrix based at least in part upon action sequence data. For example, if the graphical user interface includes n selectable graphical items, the transition probability matrix generator component 402 can generate an n×n matrix. The i, j element of the transition probability matrix generated by the transition probability matrix generator component 402 can be indicative of a probability that a user will select a jth graphical item immediately after an ith graphical item is selected. Thus, in an example, element 1, 2 in a transition probability matrix generated by the transition probability matrix generator component 402 can be indicative of a probability that the user will select a second graphical item on a graphical user interface immediately after selecting the first graphical item on the graphical user interface. Since selection sequences of selection of graphical items can be observed, the transition probability matrix generator component 402 can generate the transition probability matrix based at least in part upon the action sequence data 104 (FIG. 1). As will be described below, a view sequence of graphical items in the graphical user interface can be inferred based at least in part upon the transition probability matrix generated by the transition probability matrix generator component 402.

As indicated above, the determiner component 116 can relate the observed selections and sequences to unknown/hidden variables (which graphical items are viewed, what sequence graphical items are viewed, and which items are viewed and skipped). The determiner component 116 can deal with uncertainties in relating hidden variables to observable quantities, through utilization of a Markov model. For instance the Markov model may be a first order Markov model.

The determiner component 116 may additionally include a skip matrix generator component 404. The skip matrix generator component 404 can generate a skip matrix S, wherein S is an n×n matrix. Elements j, j of the skip matrix generated by the skip matrix generator component 404 can be indicative of a probability that the user viewed the jth graphical item but chose not to select the jth graphical item. Thus, in an example, element 3, 3 in the skip matrix S generated by the skip matrix generator component 404 can be indicative of a probability that the user viewed a third search result displayed on a graphical user interface but chose not to select the third search result. Values in the skip matrix generated by the skip matrix generator component 404 can be inferred as described below, wherein the inference is based at least in part upon the transition probability matrix generated by the transition probability matrix generator component 402.

The determiner component 116 may further include a view transition matrix generator component 406. The view transition matrix generator component 406 can generate an n×n matrix, wherein element i, j of the matrix is indicative of a probability that the jth graphical item is viewed immediately subsequent to the user viewing graphical item i. Thus, in an example, element 3, 5 of a view transition matrix would include data indicative of a probability that a fifth search result is viewed by the user immediately subsequent to the user viewing the third search result. Again, the view transition matrix can be generated by the view transition matrix generator component 406 based at least in part upon the transition probability matrix generated by the transition probability matrix generator component 402.

Pursuant to an example, the determiner component 116 can use the following equation in connection with relating the transition probability matrix generated by the transition probability matrix generator component 402 with the view transition matrix and the skip matrix generated by the view transition matrix generator component 406 and the skip matrix generator component, respectively:

$$C=(1-\alpha)V(I-\alpha SV)^{-1}(I-S),$$

where C is a transition probability matrix, V is the view transition matrix, S is the skip matrix, $\alpha$ is the average view rate, and I is the identity matrix.

As can be ascertained, relating two unknown matrices with one known matrix can result in an infinite number of solutions. The determiner component 116 can be configured to ascertain a maximum likelihood solution with respect to inferring a view sequence. To obtain the maximum likelihood solution, the determiner component 116 can select an initial condition through utilization of the following algorithm:

$$L=(1-\alpha)(C-\alpha VSC)V(I-S)=0$$

$$\nabla_V L=(1-\alpha)(I-S)+\alpha SC,$$

Pursuant to an example, the determiner component 116 can select an initial condition on the skip matrix S and view transition matrix V by setting L to zero. The determiner component 116 may thereafter utilize gradient descent to ascertain a new view transition matrix V. Thereafter, the determiner component 116 can employ a Viterbi decoding algorithm to ascertain one or more most likely view sequences from the view transition matrix, and the sequence of observed selections of the user or group of users. The view sequences can then be employed to update the skip matrix S and gradient descent can again be utilized to solve for a new view transition matrix V. These steps can be iterated until values for the view sequences converge. The skip matrix generator component 404 and the view transition matrix component 406 can be utilized in connection with updating the skip matrix and the view transition matrix, respectively, when the iterative algorithm is executing (e.g., updating values of the skip matrix and the view transition matrix in memory).

The determiner component 116 may also include a relevance assignor component 408 that can assign a relevance metric pertaining to performance of a search engine with respect to providing relevant results based at least in part upon the view sequence determined by the determiner component 116. The relevance assigner component 408, for instance, can assign a measure of relevance for at least one search result with respect to at least one query. In an example, if it is ascertained that a search result is often viewed but rarely selected, then it can be inferred that the search result is not particularly relevant to the query. The relevance assignor component 408 may then assign a relevance score to the search result pertaining to the query, such that it is less likely to be provided as a search result to the user when the user issues the query. Thus, positions that search results are shown to users may be altered, based at least in part upon the sequence data ascertained by the determiner component 116.

Again with respect to search engines, often a search result will include an answer searched for by a user in a summary section. Thus, the user may not need to actually select the search result to obtain desired information. The relevance assignor component 408 may assign a relevance score based upon the view sequence, even if a search result is not clicked. For instance, if a user does not click on a search result, the user may have obtained the information the user was searching for in the summary section displayed to the user on a search results page. It can be inferred that the search result last viewed by the user in the view sequence of the user provided the user with desired information. Thus, the relevance assignor component 408 can assign/update a measure of relevance based at least in part upon the inferred view sequence (e.g., based upon which search result was inferred to be the last search result viewed by the user). In an example, the determiner component 116 can use the following algorithm to generate a metric for search results displayed to the user:

$$\text{Metric} = \sum_{V_{seq}} \text{Score}(V_{seq}) \cdot Pr(V_{seq})$$

Additionally, while the above has been described without utilization of time between selections to ascertain view sequence, it is to be understood that the determiner component 116 can be configured to consider an amount of time between user selections in connection with determining a most likely view sequence. For instance, if the action data indicates that the user selected a first search result followed very shortly thereafter by selection of a third search result, the probability that the user viewed the second search result and then a fourth, fifth, sixth, seventh, etc., search result is relatively small. In contrast, if the user selected the first search result and a significant amount of time (e.g., 30 seconds, a minute . . . ) passed, and thereafter the user selected the third search result, the determiner component 116 can take such delay into consideration when determining a view sequence. For example, a longer amount of time between selections can indicate that the user viewed more graphical items than if there was a relatively short amount of time between selections.

Again, while examples have been provided herein pertaining to search engines, a view sequence determined by the determiner component 116 may be used in a variety of other applications, including design of graphical user interfaces for businesses, selection of where to place graphical items for advertising purposes, etc. Moreover, scoring functions generated by the relevance assigner component 408 can be undertaken for certain queries, groups of queries, individuals, particular groups of individuals, etc. Thus, search results can be customized for a user or a group of users based at least in part upon knowledge pertaining to how the user or users similar to the user view search results.

The relevance assignor component 408 may additionally consider an amount of time that the user views a particular search result (dwell time). For instance, if the user selects a search result, then views the search result for a short period of time, then goes back to the search engine, the relevance assignor component 408 can infer that such search result does not include information desired by the user for the query. Therefore, based upon a determined view sequence and a time that the user is dwelling on a search result, the relevance assignor component 408 can assign a metric that is indicative of a quality of the search result with respect to a particular query.

The view sequence determined by the determiner component 116 can be used in a variety of other applications. For instance, robots can be detected by analyzing a most likely viewed sequence against observed selections for a particular user. For example, oftentimes web sites attempt to "game" search engines to cause the search engines to display search results pertaining to a certain web site in a more prominent position. Robots are created that select the web site to cause the search engine to display the web site more prominently. By comparing a more probable view sequence with actual clicks by a user (robot), a determination can be made that the user is most likely a robot and clicks made by the user are not considered in connection with determining where to position a search result. Other applications are contemplated by the inventors, and are intended to fall under the scope of the hereto-appended claims.

Figure 5:
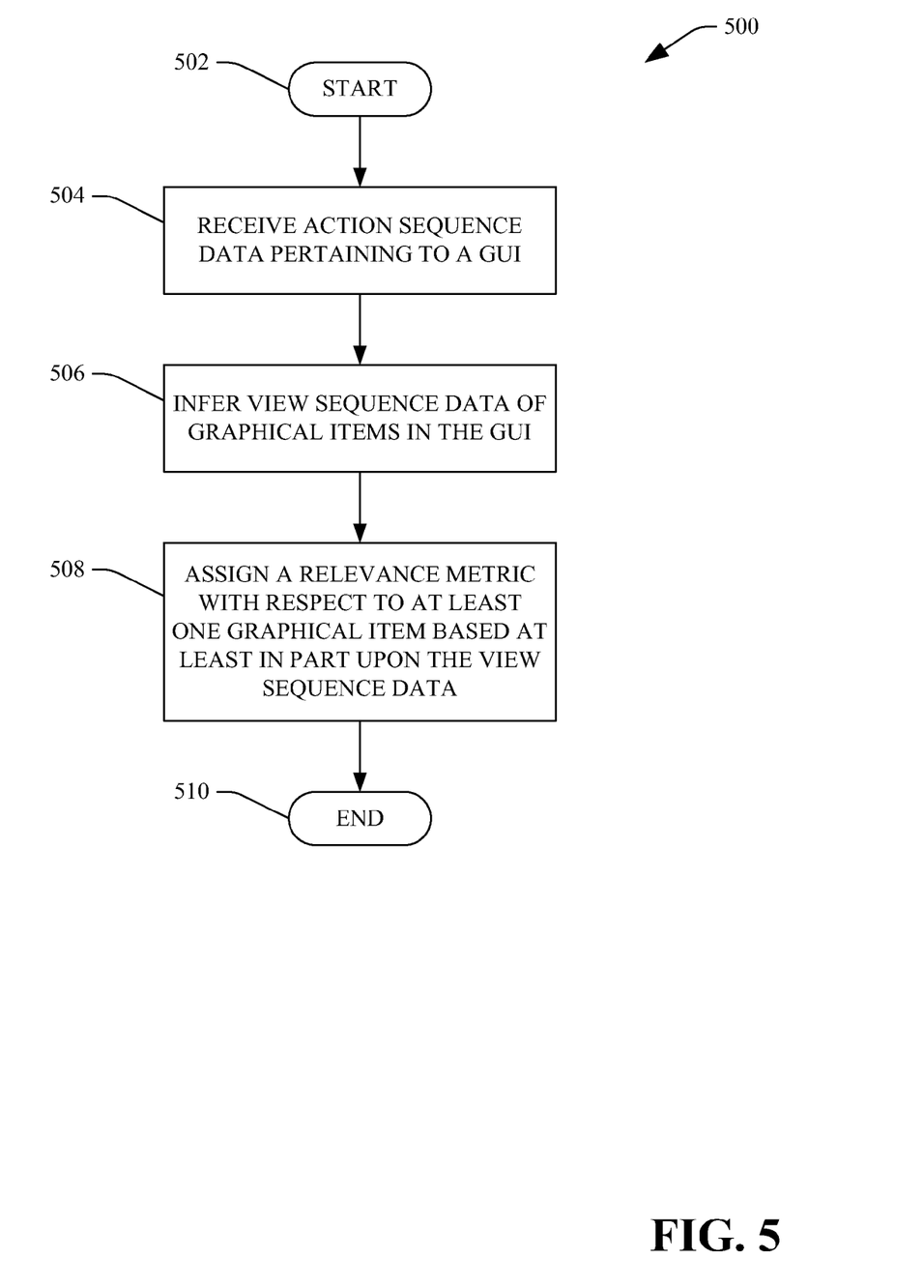
FIG. 5 is a flow diagram that illustrates an example methodology for inferring view sequence data of graphical items displayed in a graphical user interface.
Figure 6:
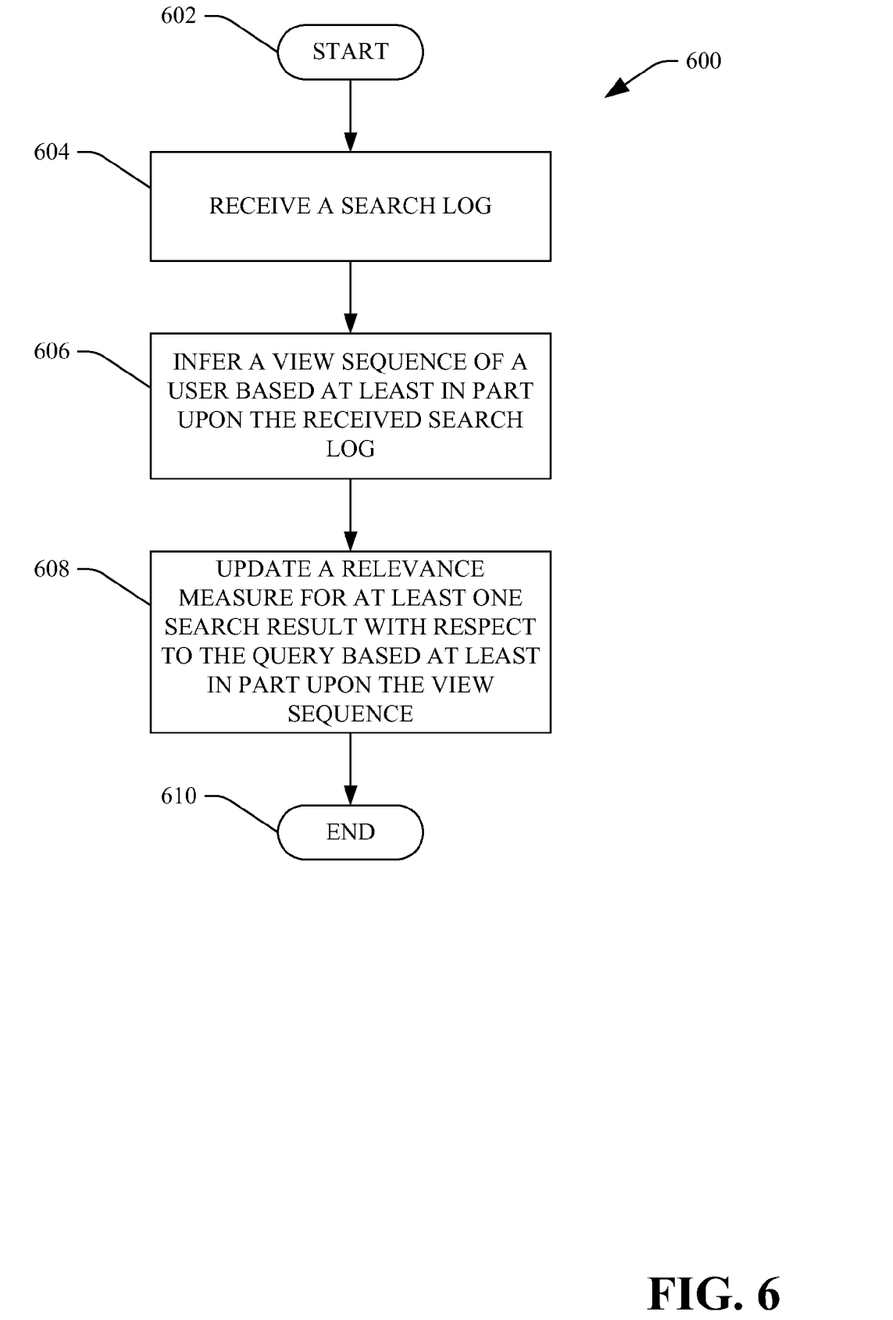
FIG. 6 is a flow diagram that illustrates an example methodology for updating a measure of relevance for at least one search result based at least in part on an inferred view sequence of search results displayed on the graphical user interface.

With reference now to FIGS. 5 and 6, example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 5, a methodology 500 that facilitates inferring view sequence data pertaining to graphical items displayed to a user in a graphical user interface is illustrated. The methodology 500 begins at 502, and at 504 action sequence data pertaining to a graphical user interface displayed to a user on a display screen of a computing device is received. For instance, the graphical user interface can display/comprise a plurality of graphical items, and the action sequence data can be indicative of a sequence of actions of the user taken with respect to a first subset of graphical items in the plurality of graphical items included in the graphical user interface. For instance, the action sequence data can be obtained from a search log. The action sequence data can include an indication that the user selected at least one graphical item in the first subset of graphical items and a time corresponding to the user selecting the at least one graphical item. This selection may be made by way of a mouse, audible indication, etc. Furthermore, the action sequence data can include an indication that the user hovered over at least one graphical item in the first subset of graphical items and a time corresponding to the user hovering over the at least one graphical item.

At 506, view sequence data with respect to a second subset of graphical items in the plurality of graphical items is inferred based at least in part upon the action sequence data. For instance, the view sequence data can be indicative of an order in which the user viewed the second subset of graphical items. Furthermore, the second subset of graphical items can include the first subset of graphical items and at least one additional graphical item in the plurality of graphical items. Therefore, the view sequence data includes an indication that the user viewed at least one graphical item that was not selected by the user. As indicated above, the graphical items can be selectable search results displayed to the user upon the user proffering a query to a search engine. Moreover, the view sequence data can be inferred based at least in part upon an amount of time between actions of the user in the action sequence data.

At 508, a relevance metric is assigned to at least one graphical item based at least in part upon the view sequence data. For example, an indication that a certain graphical item is typically clicked on when viewed indicates that the graphical item is relatively relevant (e.g., with respect to a certain query). The methodology 500 completes at 510.

Now referring to FIG. 6, an example methodology 600 that facilitates updating a relevance measure for a search result with respect to a query is illustrated. The methodology 600 starts at 602, and at 604 a search log is received. The search log can include a variety of information, such as a query issued by a user, a plurality of search results displayed to the user upon receipt of the query, a first subset of search results selected by the user upon the search results being displayed to the user on a graphical user interface, and a time corresponding to when each of the search results in the first set of search results was selected by the user. Thus, the search log includes data that is indicative of a sequence of action taken by the user with respect to search results displayed to the user.

At 606, a view sequence of the user is inferred based at least in part upon the received search log, wherein the view sequence is indicative an order that a second subset of search results in the plurality of search results were viewed by the user. Additionally, the view sequence of the user can include at least one search result that was not selected by the user.

At 608, a relevance measure is updated/assigned for at least one search result with respect to the query based at least in part upon the view sequence. The methodology 600 completes at 610.

Figure 7:
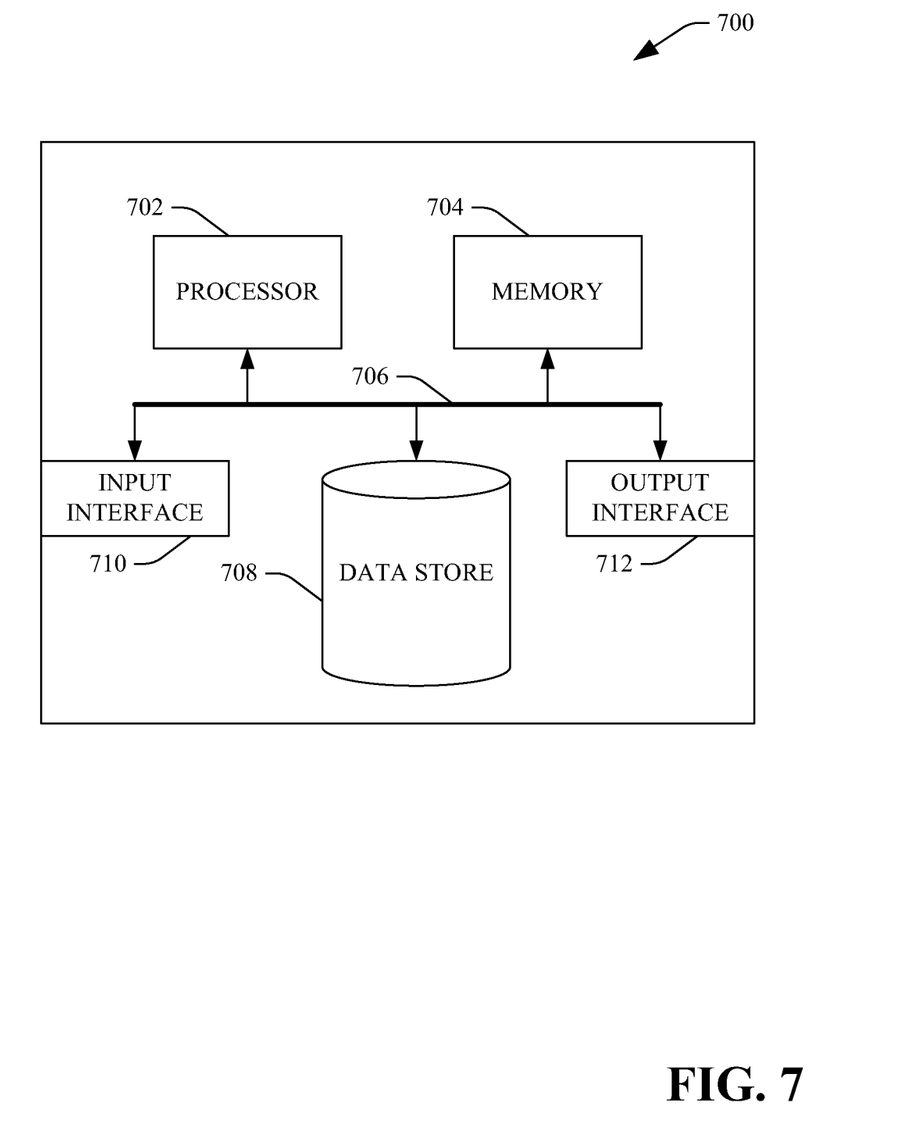
FIG. 7 is an example computing system.

Referring now to FIG. 7, a high-level illustration of an example computing device 700 that can be used in accordance with the systems and methodologies disclosed herein is illustrated. For instance, the computing device 700 may be used in a system that supports inferring a view sequence based at least in part upon observed action sequence data pertaining to a user or a set of users. In another example, at least a portion of the computing device 700 may be used in a system that supports updating/assigning a relevance score to a search result, based at least in part upon a view sequence pertaining to the search result. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store action sequence data, probabilities with respect to view sequences, etc.

The computing device 700 additionally includes a data store 708 that is accessible by the processor 702 by way of the system bus 706. The data store 708 may include executable instructions, action sequence data, etc. The computing device 700 also includes an input interface 710 that allows external devices to communicate with the computing device 700. For instance, the input interface 710 may be used to receive instructions from an external computer device, a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving action sequence data pertaining to a graphical user interface displayed to a user on a display, wherein the graphical user interface comprises a plurality of graphical items, and wherein the action sequence data is indicative of a sequence of actions of the user with respect to a first subset of graphical items in the plurality of graphical items; and
   inferring view sequence data with respect to a second subset of graphical items in the plurality of graphical items based at least in part upon the action sequence data, wherein the view sequence data is indicative of an inferred order in which the user viewed graphical items in the second subset of graphical items, the second subset of the graphical items comprises the first subset of the graphical items and at least one additional graphical item in the plurality of graphical items, the inferred order comprises a first viewing of the at least one additional graphical item followed by a viewing of a graphical item in the first subset of graphical items followed by a second viewing of the at least one other graphical item.

2. The method of claim 1, wherein the action sequence data comprises an indication that the user selected at least one graphical item in the first subset of graphical items and a time corresponding to the user selecting the at least one graphical item.

3. The method of claim 1, wherein the action sequence data comprises an indication that the user hovered over at least one graphical item in the first subset of graphical items and a time corresponding to the user hovering over the at least one graphical item.

4. The method of claim 1, wherein the action sequence data comprises an indication of an order of selections of the user of search results displayed to the user responsive to receipt of a query issued by the user, and wherein the view sequence data is indicative of an order that a subset of the search results displayed to the user were viewed by the user.

5. The method of claim 4, further comprising inferring a measure of relevance for at least one search result displayed to the user with respect to the query based at least in part upon the view sequence data.

6. The method of claim 5, wherein the measure of relevance is inferred based at least in part upon a dwell time corresponding to a search result selected by the user.

7. The method of claim 1, wherein the view sequence data is inferred based at least in part upon an amount of time between actions of the user in the action sequence data.

8. The method of claim 1, further comprising altering a design of the graphical user interface based at least in part upon inferred view sequence data with respect to multiple users of the graphical user interface, wherein the view sequence data is inferred based at least in part upon action sequence data pertaining to the multiple users of the graphical user interface.

9. The method of claim 1 configured for execution over search engine logs.

10. The method of claim 1, wherein a Markov Model is utilized in connection with inferring the view sequence data.

11. The method of claim 1, wherein inferring the view sequence data comprises:
   generating a transition probability matrix, wherein a number of graphical items in the plurality of graphical items is n, wherein the transition probability matrix is an n×n matrix, and wherein each element of the transition probability matrix comprises a probability that a jth graphical item is selected after an ith graphical item is selected, wherein the view sequence data is inferred based at least in part upon the transition probability matrix; and
   computing a skip matrix and a view transition matrix based at least in part upon the transition probability matrix, wherein the skip matrix is an n×n matrix, and wherein an element j, j in the ski matrix is a probability that the jth graphical item is viewed and not selected by the user, wherein the view transition matrix is an n×n matrix, wherein element i, j in the view transition matrix is a probability that the user views the jth graphical item immediately subsequent to viewing the ith graphical item, and wherein the view sequence data is inferred based at least in part upon the following algorithm:

$$C = (1-\alpha)V(I-\alpha SV)^{\wedge}(-1)(I-S),$$

where C is the transition probability matrix, V is the view transition matrix, S is the skip matrix, α is the average view rate, and I is the identity matrix.

12. The method of claim 11, further comprising utilizing a Viterbi algorithm to compute the view sequence data.

13. A system comprising:
a processor; and
a memory that comprises a plurality of components that are executed by the processor, the plurality of components comprising:
   a receiver component that receives action sequence data pertaining to a plurality of selectable graphical items displayed to a user on a computer display screen, wherein the action sequence data is indicative of an order in which the user performed respective actions with respect to a first subset of graphical items in the plurality of selectable graphical items; and
   a determiner component that infers a view sequence with respect to a second subset of graphical items in the plurality of graphical items, wherein the view sequence is an order that the user viewed graphical items in the second subset of graphical items, wherein the second subset of graphical items comprises the first subset of graphical items and at least one other graphical item in the plurality of graphical items, and wherein the view sequence inferred by the determiner component comprises a first viewing of the at least one other graphical item followed by a viewing of a graphical item in the first subset of graphical items followed by a second viewing of the at least one other graphical item.

14. The system of claim 13, wherein the action sequence data is included in a search engine log, wherein the search engine log comprises data indicating which search results were selected by the user, time that the search results were selected by the user, which search results were hovered over by the user, and time that the search results were hovered over by the user.

15. The system of claim 14, wherein the plurality of graphical items are search results displayed to the user responsive to receipt of a search query issued by the user, and the plurality of components further comprising a relevance assignor component that assigns a measure of relevance to at least one of the search results with respect to the query based at least in part upon the view sequence.

16. The system of claim 13, wherein the determiner component infers a probability that at least one search result was viewed and skipped by the user in connection with inferring the view sequence of the user.

17. The system of claim 13, wherein the plurality of graphical items comprises a first selectable search result and a second selectable search result, and wherein the determiner component infers a probability that the user viewed the first search result and then immediately subsequently viewed the second search result.

18. A computing device comprising a computer-readable medium, the computer-readable medium comprising instructions that, when executed by a processor, cause the processor to perform acts, comprising:
   receiving a search log, wherein the search log comprises a query issued by a user, a plurality of search results displayed to the user upon receipt of the query, a first subset of search results selected by the user, and a respective time when each search result in the first subset of search results were selected by the user;
   inferring a view sequence of the user based at least in part upon the received search log, wherein the view sequence is an order that a second subset of search results in the plurality of search results were viewed by the user, wherein the view sequence of the user includes at least one search result not selected by the user, and wherein the view sequence comprises a first viewing of the at least one search result not selected by the user followed by a viewing of a search result in the first subset of search results followed by a second viewing of the at least one search result not selected by the user; and
   updating a relevance measure for at least one search result with respect to the query based at least in part upon the view sequence.

19. The method of claim 1, wherein the order in which the user viewed the second subset of graphical items comprises a viewing of the at least one additional item followed by a viewing of a graphical item in the first subset of graphical items followed by a viewing of the at least one additional item.

20. The system of claim 13, wherein the determiner component generates a transition probability matrix, wherein a number of graphical items in the plurality of selectable graphical items is n, wherein the transition probability matrix is an n×n matrix, wherein each element of the transition probability matrix comprises a probability that a jth graphical item is selected after an ith graphical item is selected, and wherein the determiner component computes a skip matrix and a view transition matrix based at least in part upon the transition probability matrix, wherein the skip matrix is an n×n matrix, wherein an element j, j in the skip matrix is a probability that the jth graphical item is viewed and not selected by the user, wherein the view transition matrix is an n×n matrix, wherein element i, j in the view transition matrix is a probability that the user views the jth graphical item immediately subsequent to viewing the ith graphical item, and wherein the determining component infers the view sequence based at least in part upon the transition probability matrix, the skip matrix, and the view transition matrix.

* * * * *